No. 730,435. PATENTED JUNE 9, 1903.
H. H. CHASE.
VEHICLE SCALE.
APPLICATION FILED JULY 5, 1902.
NO MODEL. 2 SHEETS—SHEET 1.
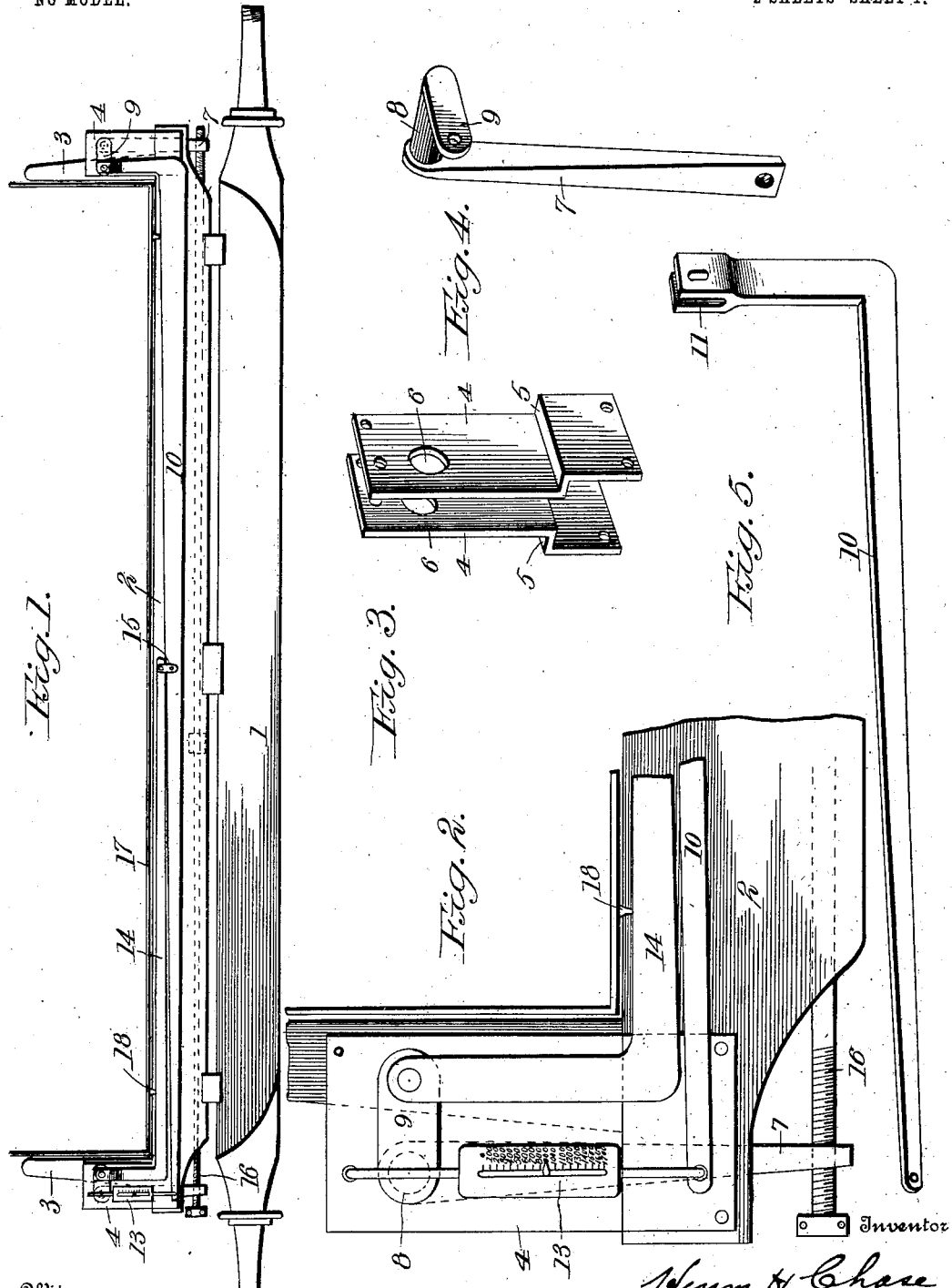

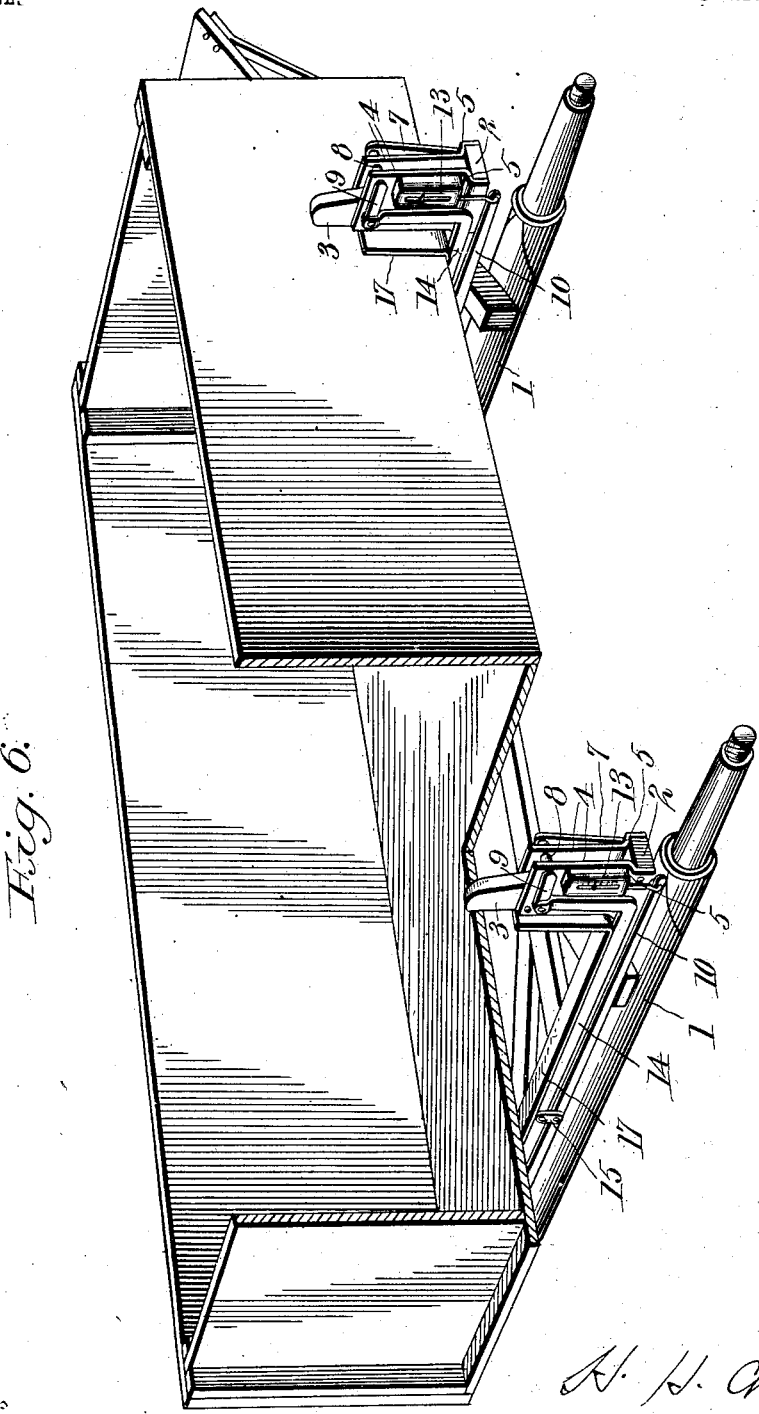

No. 730,435.

Patented June 9, 1903.

UNITED STATES PATENT OFFICE.

HENRY H. CHASE, OF BRIGHAM, UTAH.

VEHICLE-SCALE.

SPECIFICATION forming part of Letters Patent No. 730,435, dated June 9, 1903.

Application filed July 5, 1902. Serial No. 114,483. (No model.)

*To all whom it may concern:*

Be it known that I, HENRY H. CHASE, a citizen of the United States of America, residing at Brigham, in the county of Boxelder and State of Utah, have invented certain new and useful Improvements in Vehicle-Scales, of which the following is a specification.

This invention relates to scales, and particularly to that class designed for use on vehicles.

The object of the invention is to produce scales which are attached to the front and rear bolster of a wagon and whereby the bed is suspended for the purpose of weighing its contents.

Furthermore, the object of the invention is to produce scales whereby the load may be transferred from the bolsters and back again through the manipulation of load-elevating devices which are readily actuated.

Furthermore, the object of the invention is to produce scales having advantages in points of simplicity, efficiency, and durability, proving at the same time comparatively inexpensive.

With the foregoing and other objects in view the invention consists in the details of construction and in the arrangement and combination of parts to be hereinafter more fully set forth and claimed.

In describing the invention in detail reference will be had to the accompanying drawings, forming part of the specification, wherein like characters denote corresponding parts in the several views, and in which—

Figure 1 is a view in elevation of the rear bolster of a wagon with the invention applied. Fig. 2 is an enlarged detail view of the end connections, the central connection being broken away. Figs. 3, 4, and 5 are perspective views of elements of the combination. Fig. 6 is a perspective view showing the device as applied to the front and rear bolsters of a wagon.

In the drawings, 1 indicates the axle of an ordinary wagon having secured thereto a bolster 2. At each end of the bolster is a standard 3, to which are secured on each side plates 4, said plates having shoulders 5, which seat on the bolster, and coinciding apertures 6. A bell-crank lever 7 has a pivot 8 swinging in the apertures in the plates 4 and standard 3. A lever 10 approximately the shape of a right angle has a bifurcated end 11, connected with an arm 9 of the bell-crank lever by means of a bolt or pin. The lever extends across the wagon on the rear side of the bolster and is supported on the opposite side by a spring-balance 13. The plates are provided for each of the standards, and the bell-crank lever is of similar structure for each of the standards. A lever 14 similar to the lever 10 is pivoted on the arm of the bell-crank, which supports the spring-balance 13, said lever extending under the wagon-body and terminating approximately in the transverse center. A link 15 is pivoted to the lever 14 and intermediately the lever 10, so that any movement of the lever 14 is communicated to the lever 10. The downwardly-extending legs of the bell-crank lever are moved in opposite direction transversely of the vehicle-body by means of a threaded rod 16, and it will be observed that by rotating the rod 16 to throw the ends of the bell-cranks inwardly will cause the arm 9 to swing upward, thereby carrying the levers 10 and 14, resulting in the suspension of the body on the levers clear of the bolsters. I provide angle-irons 17, which extend transversely of the bed close to the bolster, said angle-irons being bolted to the wagon-bed. A foot or support 18, pivoted near each end of the angle-iron, will be supported by the levers, and the supports will in turn carry the bed.

The parts heretofore described are duplicated for the front bolster, and the sum of the weights indicated by the scales on the spring-balances will be the weight of the bed and its contents.

The construction, operation, and advantages, it is thought, will be understood from the foregoing description, it being noted that various changes may be made in the proportions and details of construction without departing from the scope of the invention.

Having fully described my invention, what I claim as new, and desire to secure by Letters Patent, is—

1. In a device of the character described, bolsters and their standards, plates supported by the bolsters, bell-crank levers pivoted in apertures of the plates, levers pivoted to the bell-crank levers, scales connected to the levers to indicate the weight thereon and means whereby the levers are caused to suspend a wagon-bed clear of the bolsters.

2. In a vehicle-scales, plates having shoulders and coinciding apertures secured to the standards of a vehicle, bell-crank levers having a pivot swung in the coinciding apertures of the plates, levers connected to the arms of the bell-crank levers for supporting a body and a scale to which the levers are connected.

3. In a vehicle-scales, bell-crank levers suitably pivoted, a lever pivoted to one arm of the bell-crank of the front bolster and a second lever pivoted to one arm of the bell-crank of the rear bolster, both of said levers extending across the vehicle-body, scales for supporting the ends of said levers, levers pivoted to the bell-cranks at the opposite side of the body and extending in an opposite direction to the first-named levers and terminating intermediately the width of the body, links connecting the second-named levers to the first-named levers and means for causing the levers to support the body.

4. In a vehicle-scales, plates having shoulders and coinciding apertures secured to the standards of a vehicle, bell-crank levers having pivots swung in the coinciding apertures of the plates, angular irons secured to the wagon-body, supporting-legs pivoted to the angle-irons, levers connected to the arms of the bell-crank levers and engaging supports and a scale to which the levers are connected.

5. In a vehicle-scales, bell-crank levers suitably pivoted, a lever pivoted to one arm of the bell-crank of the front bolster and a second lever pivoted to one arm of the bell-crank of the rear bolster, both of said levers extending across the vehicle-body, scales for supporting the ends of said levers, levers pivoted to the bell-cranks at the opposite side of the body and extending in an opposite direction to the first-named levers and terminating intermediately the width of the body, links connecting the second-named levers to the first-named levers, a rod having threaded ends connecting the downwardly-extending arms of the bell-crank levers and means whereby said bell-cranks are adjusted with relation to each other.

In testimony whereof I affix my signature, in the presence of two witnesses, this 21st day of June, 1902.

HENRY H. CHASE.

Witnesses:
GEO. R. CHASE,
GEO. W. McINTIRE.